United States Patent
Oh et al.

(10) Patent No.: US 10,483,605 B2
(45) Date of Patent: Nov. 19, 2019

(54) BATTERY COOLING SYSTEM FOR VEHICLE

(71) Applicants: Hyundai Motor Company, Seoul (KR); Kia Motors Corporation, Seoul (KR)

(72) Inventors: Man Ju Oh, Gyeonggi-do (KR); Sang Shin Lee, Gyeonggi-do (KR); So Yoon Park, Gyeonggi-do (KR); Jae Woong Kim, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,082

(22) Filed: Nov. 29, 2017

(65) Prior Publication Data
US 2019/0097288 A1 Mar. 28, 2019

(30) Foreign Application Priority Data
Sep. 28, 2017 (KR) .................. 10-2017-0125981

(51) Int. Cl.
*H01M 10/6567* (2014.01)
*H01M 10/625* (2014.01)
*H01M 10/6556* (2014.01)
*H01M 10/613* (2014.01)
*B60L 58/26* (2019.01)
*H01M 10/6569* (2014.01)

(52) U.S. Cl.
CPC ......... *H01M 10/6567* (2015.04); *B60L 58/26* (2019.02); *H01M 10/613* (2015.04); *H01M 10/625* (2015.04); *H01M 10/6556* (2015.04); *H01M 10/6569* (2015.04); *H01M 2220/20* (2013.01)

(58) Field of Classification Search
CPC .......... H01M 10/6567; H01M 10/613; H01M 10/625; H01M 10/6556; H01M 2220/20; B60L 11/1874
USPC ....................................................... 429/120
See application file for complete search history.

(56) References Cited

U.S. PATENT DOCUMENTS

| | | | |
|---|---|---|---|
| 2011/0206967 A1* | 8/2011 | Itsuki ...................... | B60K 1/04 429/120 |
| 2014/0363712 A1* | 12/2014 | Wohrle ................ | H01M 2/024 429/94 |
| 2015/0200429 A1* | 7/2015 | Lee ..................... | H01M 10/613 429/120 |

FOREIGN PATENT DOCUMENTS

KR 10-2012-0066340 6/2012

* cited by examiner

*Primary Examiner* — Gary D Harris
(74) *Attorney, Agent, or Firm* — Mintz Levin Cohn Ferris Glovsky and Popeo, P.C.; Peter F. Corless

(57) ABSTRACT

A battery cooling system for a vehicle includes: a battery module supplying drive energy to a vehicle; a liquid supply unit supplying liquid to the battery module; and an injection unit configured such that a first side of the injection unit is connected to the liquid supply unit to be supplied with liquid from the liquid supply unit and a second side of the injection unit is adjacent to the battery module to supply the liquid supplied from the liquid supply unit to an outer surface of the battery module, thereby cooling the battery module by using latent heat of evaporation of the liquid.

15 Claims, 9 Drawing Sheets

BATTERY COOLING SYSTEM FOR VEHICLE

CROSS REFERENCE TO RELATED APPLICATION

The present application claims under 35 U.S.C. § 119(a) the benefit of Korean Patent Application No. 10-2017-0125981, filed Sep. 28, 2017, the entire contents of which are incorporated by reference herein.

BACKGROUND

(a) Technical Field

The present disclosure relates generally to a battery cooling system provided with a battery module supplying drive energy to a vehicle, more particularly, to a battery cooling system configured to be provided with a water-cooled system to cool the battery.

(b) Description of the Related Art

An electric vehicle equipped with a battery module that provides drive energy to the electric vehicle derives its drive energy from electric energy, not from fossil fuel combustion. Although electric vehicles have no exhaust gas and produce very little noise, they have limited practical use due to problems such as heavy weight of the battery and time taken to charge the battery. However, the development of electric vehicles is being accelerated due to problems such as pollution and depletion of fossil fuels. Particularly, in order for the electric vehicle to be more widely adopted, the battery module, which is the fuel supply source of the electric vehicle, must be made lighter and smaller, and at the same time, the charging time must be shortened.

The battery module includes a plurality of battery cells connected in series, such that when the battery module is charged and discharged, the battery cells generate heat. If the heat generated in the battery cells is left in place, the performance of the battery cell is deteriorated and the life of the battery cell is shortened. Accordingly, the electric vehicle is generally provided with a cooling system for cooling the battery module.

However, in the case of a conventional water-cooled battery structure configured to circulate coolant at the bottom of the battery module, typically about 7 kg of coolant passes through the bottom of the battery, and the air conditioning system or a separate air/water heat exchanger must be operated to prevent the battery module from overheating, which consumes too much electric power of the electric vehicle, resulting in a problem that mileage is reduced.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a battery cooling system for a vehicle, which is capable of effectively cooling a battery module supplying drive energy to a vehicle.

In order to achieve the above object, according to one aspect of the present disclosure, there is provided a battery cooling system for a vehicle, the battery cooling system including: a battery module supplying drive energy to a vehicle; a liquid supply unit supplying liquid to the battery module; and an injection unit configured such that a first side thereof is connected to the liquid supply unit to be supplied with liquid from the liquid supply unit and a second side thereof is adjacent to the battery module to supply the liquid supplied from the liquid supply unit to an outer surface of the battery module, thereby cooling the battery module by using latent heat of evaporation of the liquid.

The battery module may be provided with a casing surrounding an outermost portion thereof, and the casing may be provided with a coating layer by being coated with a hydrophilic porous material on an outer surface thereof, thereby facilitating diffusion of the liquid when the liquid is injected.

The injection unit may include: a flow tube configured such that a first side thereof is connected to the liquid supply unit and a second side thereof extends from the liquid supply unit to be adjacent to the battery module; and a plurality of injection nozzles provided to be spaced apart from the flow tube at a predetermined interval, wherein the liquid of the liquid supply unit flows along the flow tube and then is injected through the injection nozzles.

The battery module may be provided with a seat groove grooved toward the battery module at a location corresponding to the flow tube, such that the flow tube is seated in the seat groove.

The battery module may be disposed under a vehicle floor while being spaced apart therefrom, such that a space is provided between the vehicle floor and the battery module with the injection unit disposed in the space, whereby an upper portion of the battery module is cooled.

The space may be configured such that a first side thereof is provided with an inlet to allow air to be introduced therethrough from an outside of the vehicle and a second side thereof is provided with an outlet to exhaust the air flowing in the space, and the liquid injected by the injection unit during vehicle travel may be evaporated by running wind introduced through the inlet, whereby the battery module is cooled by latent heat of evaporation.

The inlet may be disposed at a front of the vehicle and the outlet may be disposed at a back of the vehicle, wherein the air flows from the inlet to the outlet in the space by the running wind.

The inlet or the outlet may be provided with a door opening and closing the inlet or the outlet so as to adjust an amount of the air flowing in the space.

The battery module may be disposed to be spaced apart from a vehicle body such that a space is provided between the vehicle body and the battery module, and the injection unit may include a flow tube with the liquid of the liquid supply unit flowing therethrough, wherein the flow tube extends in a longitudinal direction of the vehicle to avoid resistance to a flow of the air passing through the space.

A pump may be provided between the liquid supply unit and the injection unit, and when the pump is operated, the liquid of the liquid supply unit may flow through the injection unit to cool the battery module.

The liquid supply unit may be a reservoir tank disposed at a location higher than the battery module, and the liquid stored in the liquid supply unit may be coolant.

The liquid supply unit may be disposed at a location higher than the battery module, and the liquid stored in the liquid supply unit may be washer fluid.

A multiway valve controlled by a control unit may be provided between the liquid supply unit and the injection unit, and the multiway valve may be connected with the liquid supply unit, the injection unit, and the washer nozzle and the control unit may control the multiway valve to be selectively opened and closed, thereby cooling the battery module or cleaning a windshield.

The liquid supply unit may be disposed at a location lower than a core of an air conditioning system of the vehicle.

The liquid supply unit may be a water box receiving condensate of the core generated when the air conditioning system is operated, from below, to collect the condensate.

A vehicle body may be provided with an induction tube configured to collect liquid outside the vehicle and supply the same to the liquid supply unit, such that the liquid supply unit is constantly filled with liquid to cool the battery module without the liquid being separately supplied to the liquid supply unit.

According to the battery cooling system for a vehicle configured as described above, unlike the conventional system, in which the air conditioner or the cooling module is operated to cool the battery module so the consumed power is 1 to 4 kW, in the present disclosure, since the battery module can be cooled by only operating the pump, it is possible to sufficiently cool the battery module by only about 10 W consumed by the pump, whereby the mileage of the electric vehicle can be increased.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a battery cooling system for a vehicle according to an exemplary embodiment of the present disclosure will be described in detail with reference to the accompanying drawings.

Figure 1:
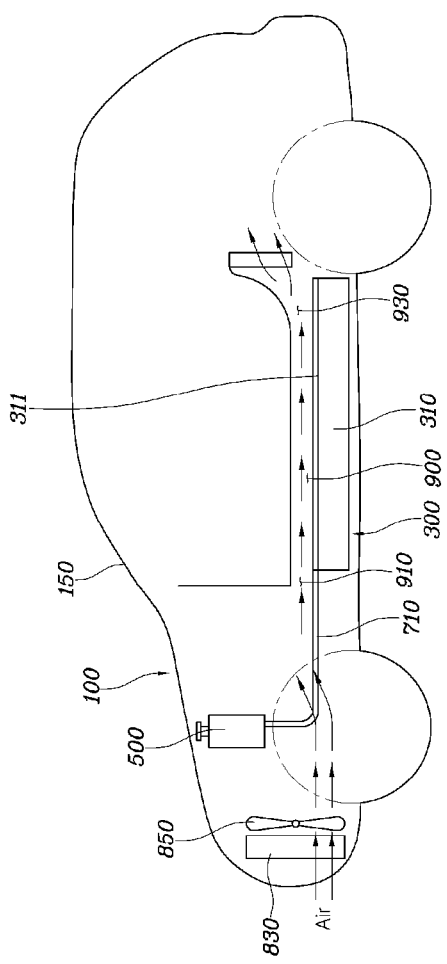
FIG. 1 is a view showing a vehicle provided with a battery cooling system according to an embodiment of the present disclosure.
Figure 2:
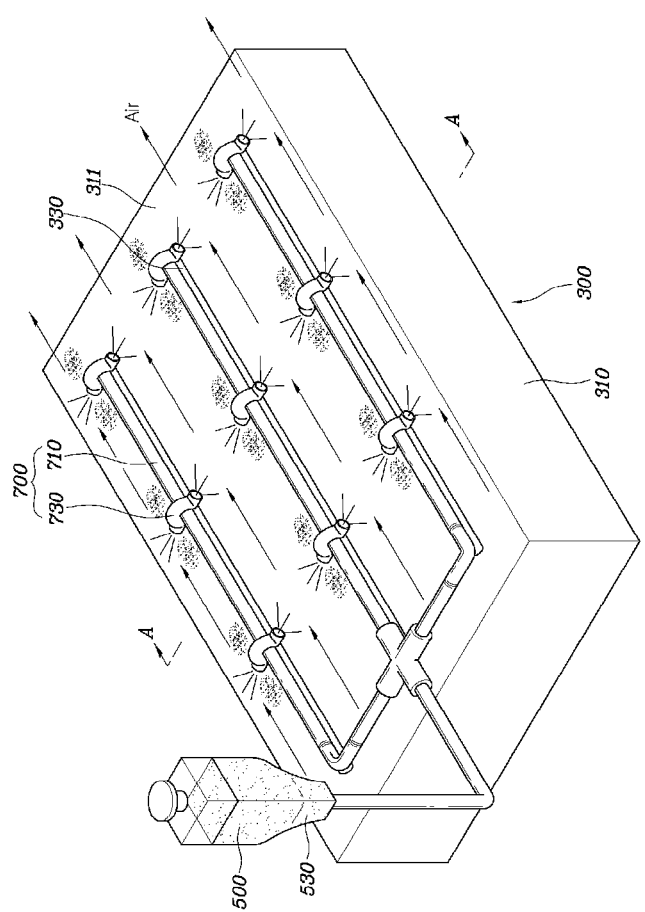
FIG. 2 is a view showing a battery cooling system for a vehicle according to a first embodiment of the present disclosure.
Figure 3:
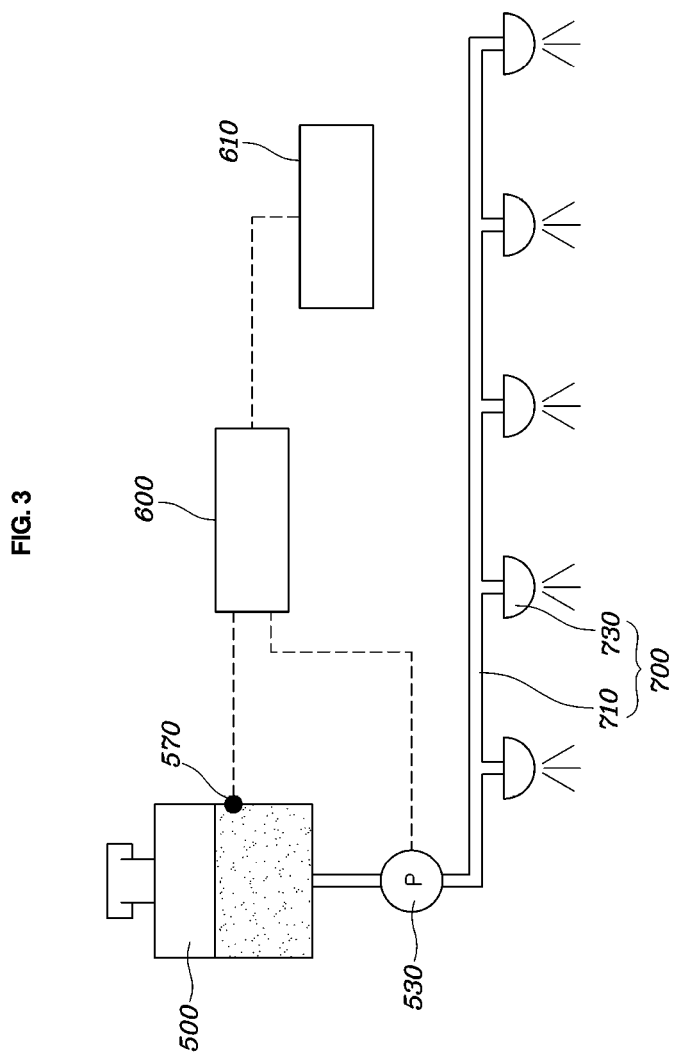
FIG. 3 is a view schematically showing the system of FIG. 2.
Figure 4:
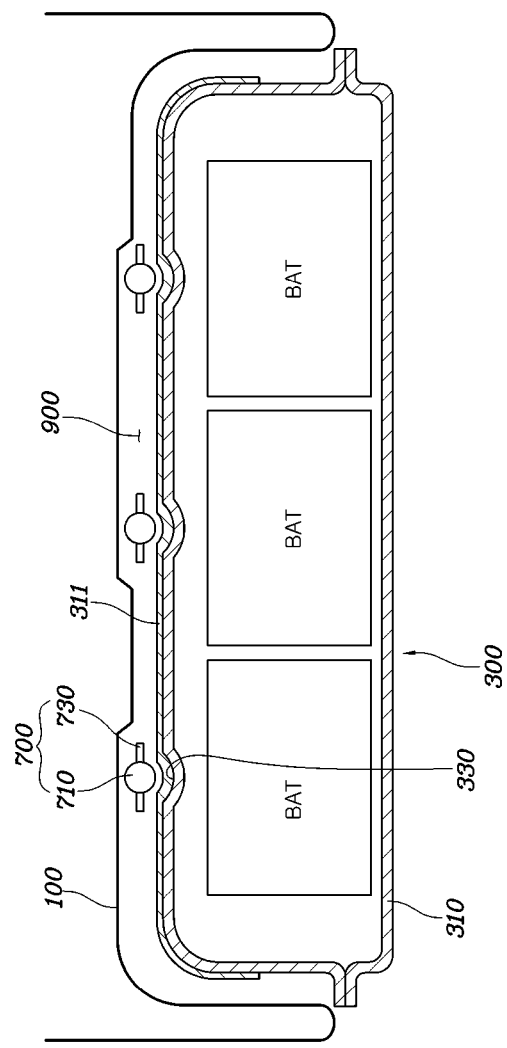
FIG. 4 is a view taken along line A-A of FIG. 2.
Figure 5:
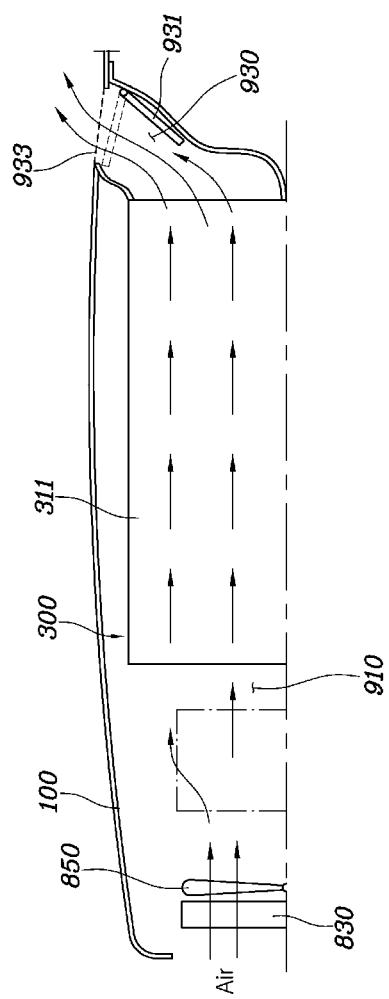
FIG. 5 is a view showing an upper portion of a battery module.
Figure 6:
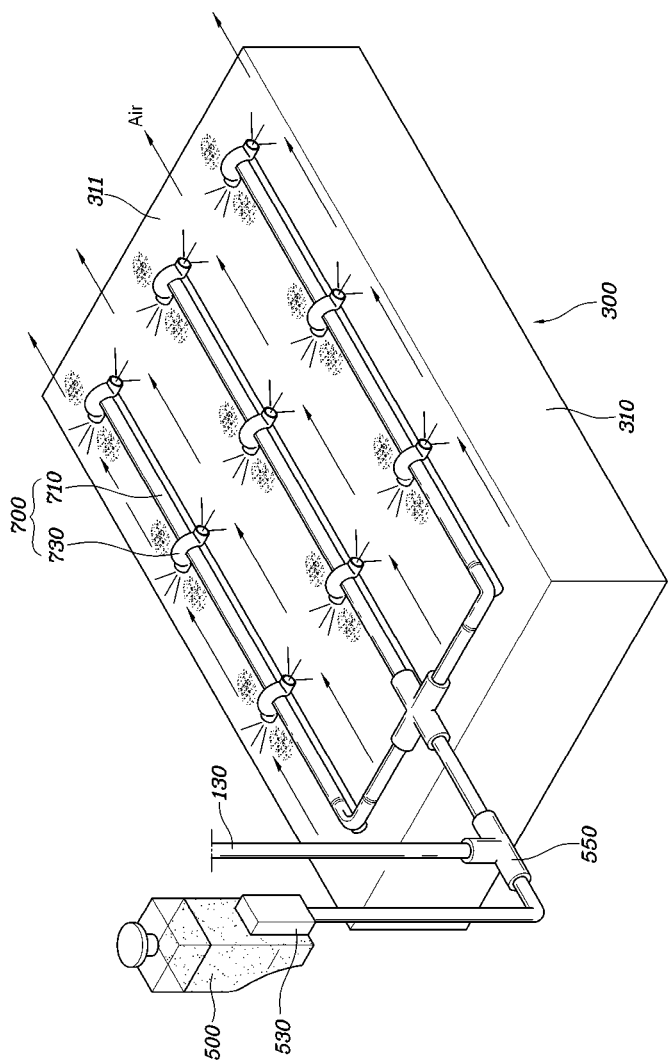
FIG. 6 is a view showing a battery cooling system for a vehicle according to a second embodiment of the present disclosure.
Figure 7:
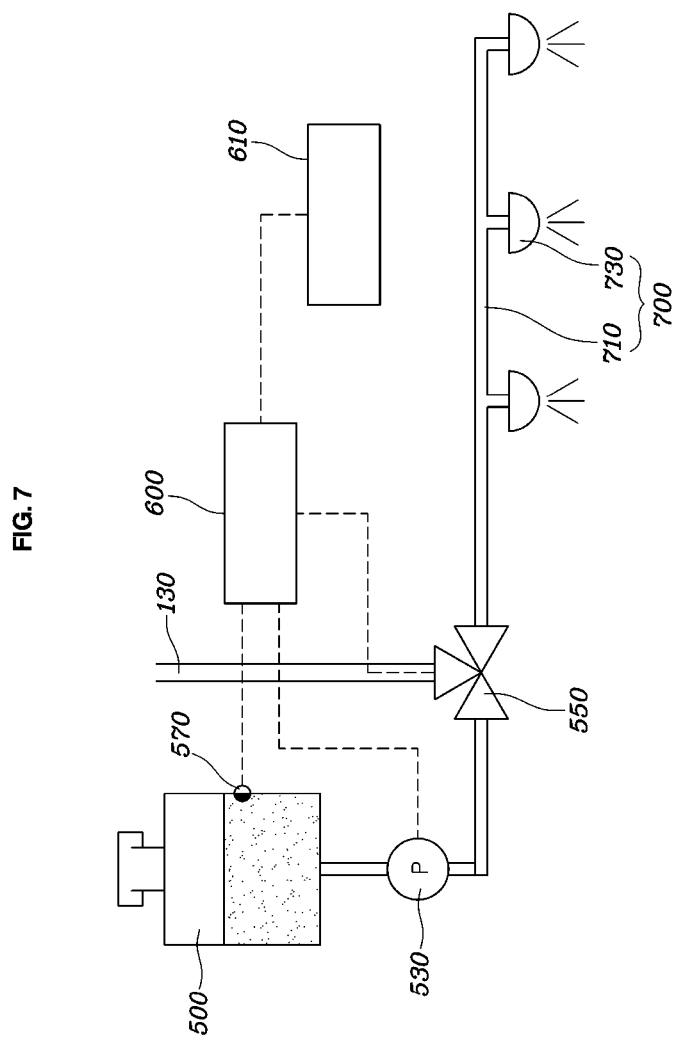
FIG. 7 is a view schematically showing the system of FIG. 6.
Figure 8:
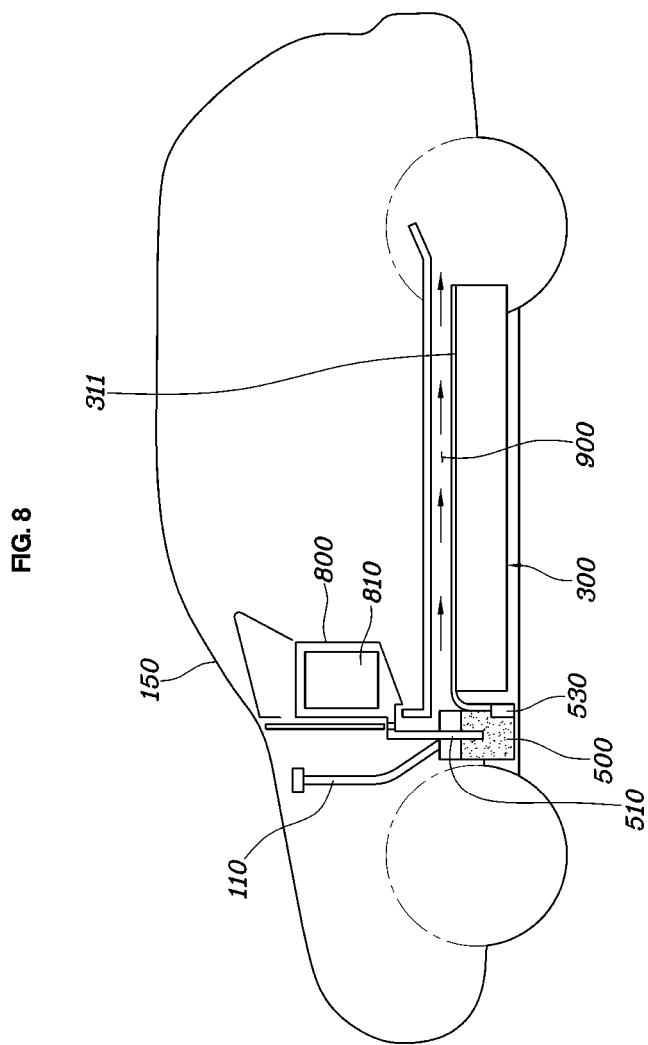
FIG. 8 is a view showing a vehicle provided with a battery cooling system for a vehicle according to a third embodiment of the present disclosure.
Figure 9:
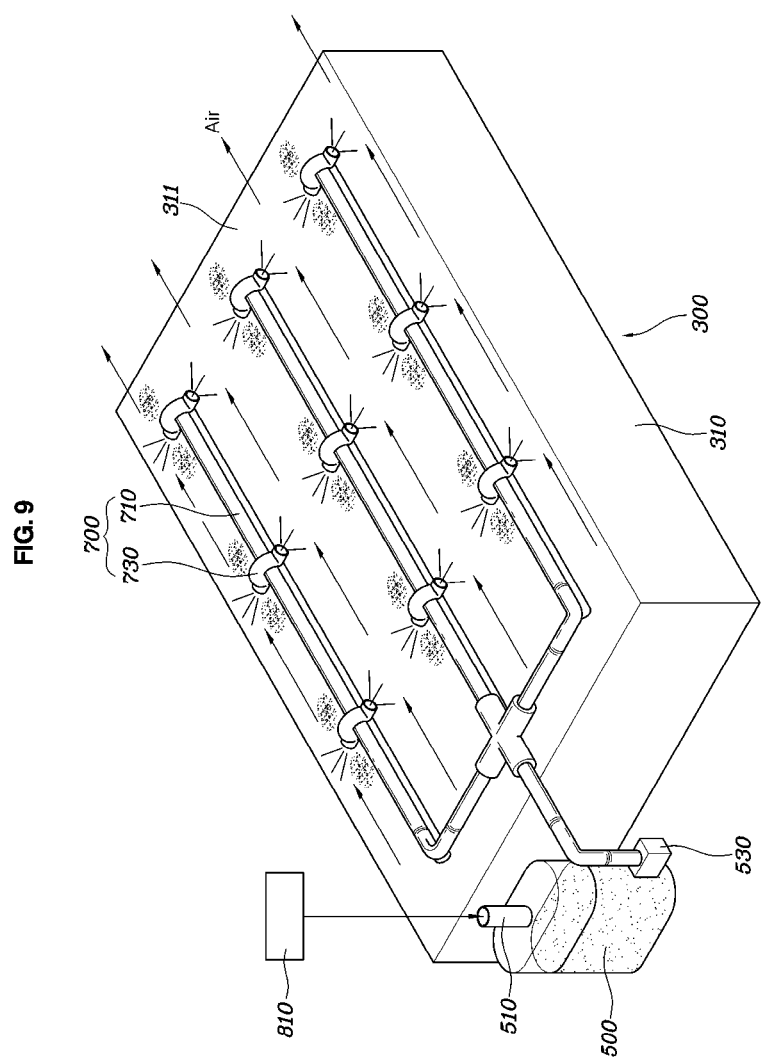
FIG. 9 is a view showing the battery cooling system for a vehicle according to the third embodiment of the present disclosure.

FIG. 1 is a view showing a vehicle provided with a battery cooling system for a vehicle according to an embodiment of the present disclosure; FIG. 2 is a view showing a battery cooling system for a vehicle according to a first embodiment of the present disclosure; FIG. 3 is a view schematically showing the system of FIG. 2; FIG. 4 is a view taken along line A-A of FIG. 2; FIG. 5 is a view showing an upper portion of a battery module; FIG. 6 is a view showing a battery cooling system for a vehicle according to a second embodiment of the present disclosure; FIG. 7 is a view schematically showing the system of FIG. 6; FIG. 8 is a view showing a vehicle provided with a battery cooling system for a vehicle according to a third embodiment of the present disclosure; and FIG. 9 is a view showing the battery cooling system for a vehicle according to the third embodiment of the present disclosure.

A battery cooling system for a vehicle according to a preferred embodiment of the present disclosure includes: a battery module 300 supplying drive energy to a vehicle; a liquid supply unit 500 supplying liquid to the battery module 300; and an injection unit 700 configured such that a first side thereof is connected to the liquid supply unit 500 to be supplied with liquid from the liquid supply unit 500 and a second side thereof is adjacent to the battery module 300 to supply the liquid supplied from the liquid supply unit 500 to an outer surface of the battery module 300, thereby cooling the battery module 300 by using latent heat of evaporation of the liquid.

The battery module 300 is provided in the vehicle to supply drive energy. In particular, when a large number of batteries BAT are provided in the vehicle as a module, for center-of-gravity distribution and stable positioning of the vehicle, cooling of the battery module 300, and the like, the module is provided under a floor panel of a vehicle body 100. The present disclosure is a battery cooling system for a vehicle cooling the battery module 300 when the battery module 300 is provided as described above. In the description, although it is exemplarily shown and described that the battery cooling system for a vehicle is provided above the battery module 300, it is to be understood that such a position is only an optimal position, and may be provided at a side or under the battery module, and is not particularly limited to being provided above the battery module.

The liquid supplied to cool the battery module 300 is stored in the liquid supply unit 500. The liquid stored in the liquid supply unit 500 may be of various kinds. In the first embodiment, the liquid stored in the liquid supply unit 500 may be coolant, and the coolant may be injected by a user separately. In the second embodiment, the liquid stored in the liquid supply unit 500 may be washer fluid, and a general washer fluid tank, in which a washer fluid is stored to clean a windshield 150, may be used as the liquid supply unit 500. Further, in the third embodiment, the liquid stored in the liquid supply unit 500 may be condensate of the core 810 generated when an air conditioning system 800 of the vehicle is operated, which is drained and collected in the liquid supply unit 500 and then used to cool the battery module 300. The liquid supply unit 500 is provided with a pump 530 allowing the liquid of the liquid supply unit 500 to flow toward the battery module 300, and a water level sensor 570 sensing the water level in the liquid supply unit 500. Details of each embodiment will be described hereinafter.

The injection unit 700 is configured such that the first side thereof is connected to the liquid supply unit 500 to be supplied with the liquid from the liquid supply unit 500 and the second side thereof is adjacent to the battery module 300 to supply the liquid supplied from the liquid supply unit 500 to the outer surface of the battery module 300, thereby cooling the battery module 300 by using latent heat of evaporation of the liquid. To be more specific, the injection unit 700 includes: a flow tube 710 configured such that a first side thereof is connected to the liquid supply unit 500 and a second side thereof extends from the liquid supply unit 500 to be adjacent to the battery module 300; and a plurality of injection nozzles 730 provided to be spaced apart from the flow tube 710 at a predetermined interval. The flow tube 710 may be provided in plural. Thus, the liquid of the liquid supply unit 500 flows along the flow tube 710 and then is injected through the injection nozzles 730, thereby cooling the battery module 300. Further, the pump 530 is provided between the liquid supply unit 500 and the injection unit 700, and when the pump 530 is operated, the liquid of the liquid supply unit 500 flows through the injection unit 700, thereby cooling the battery module 300.

The battery module 300 of the present disclosure is provided with a casing 310 surrounding an outermost portion thereof, and an outer surface of the casing 310 is provided with a coating layer 311 by being coated with a hydrophilic porous material. Accordingly, when the liquid supplied from the liquid supply unit 500 is injected to the battery module 300, the liquid supplied from the liquid supply unit 500 is diffused by the fine holes formed in the coating layer 311 to facilitate evaporation. Further, the battery module 300 is provided with a seat groove 330 grooved toward the battery module 300 at a location corresponding to the flow tube 710. Accordingly, the flow tube 710 is seated in the seat groove 330 to be fixed thereto, whereby it is stably fixed even if a vibration or an impact occurs due to the running of the vehicle.

The battery module 300 is disposed under the floor panel of the vehicle body 100 while being spaced apart therefrom, such that a space 900 is provided between the floor panel and the battery module 300. The injection unit 700 is disposed in the space 900. Accordingly, an upper portion of the battery module 300 is cooled by the injection unit 700, and the side and lower surfaces of the battery module 300 can be cooled by running wind generated during vehicle travel, whereby the upper, lower, and side surfaces of the battery module 300 can be cooled.

The space 900 is configured such that a first side thereof is provided with an inlet 910 to allow air to be introduced therethrough from an outside of the vehicle and a second side thereof is provided with an outlet 930 to exhaust the air flowing in the space 900. In particular, the inlet 910 is disposed at a front of the vehicle and the outlet 930 is disposed at a back of the vehicle, wherein the air flows from the inlet 910 to the outlet 930 in the space 900 by the running wind. Accordingly, during vehicle travel, the air flowing through a radiator 830 and a fan 850 at the front of the vehicle flows into the inlet 910, passes through the space 900, and is discharged to the outlet 930. The reason for configuring air to be introduced into the space 900 as described above is that the liquid does not evaporate quickly enough to cool the battery module 300 even if the liquid is atomized and injected through the injection unit 700 and the heat of the battery module 300 is used. Thus, during vehicle travel, the liquid of the liquid supply unit 500 is injected through the injection nozzles 730 of the injection unit 700, and the air is introduced through the space 900 and then discharged, whereby the liquid being injected is rapidly evaporated by the air flowing within the space 900 so that the battery module 300 can be cooled by latent heat of evaporation.

In particular, in the case where the flow tube 710 is provided in the space 900, the flow tube 710 is configured to extend in a longitudinal direction of the vehicle. In other words, during vehicle travel, when the air is introduced and flows in the space 900, it is possible to avoid resistance to the air flow by the flow tube 710.

Further, the vehicle body 100 may be provided with a grill 933 configured to extend from the inlet 910 or the outlet 930 to communicate therewith, at a location where the inlet 910 or the outlet 930 is provided, and the grill 933 may be provided with a door 931 opening and closing the inlet 910 or the outlet 930. Accordingly, the degree of opening of the inlet 910 or the outlet 930 can be adjusted through the door 931 such that Bernoulli phenomenon is applied, whereby it is possible to introduce or discharge air proportional to the vehicle speed by adjusting the amount of the air flowing in the space 900.

Each embodiment will be described in more detail with reference to the accompanying drawings.

FIGS. 2 to 3 show the first embodiment of the present disclosure, wherein it is shown that the liquid stored in the liquid supply unit 500 is coolant. Here, it is preferred that the liquid supply unit 500 be a reservoir tank disposed at a location higher than the battery module 300. In a battery management system (BMS) 610 of the vehicle, if it is determined that the battery module 300 needs to be cooled, the outside temperature and the temperature rising rate of the battery module 300 are sensed to determine the amount of the liquid supplied from the liquid supply unit 500, and a signal is sent to a control unit 600. Then, the control unit 600 controls the pump 530 to be operated, and adjusts the degree of opening of the door 931 of the outlet 930. Accordingly, the liquid of the liquid supply unit 500 passes through the flow tube 710 and is injected through the injection nozzles 730, and the air introduced from the front of the vehicle is discharged through the outlet 930 via the inlet 910. Thus, the liquid injected on the upper surface of the battery module 300 spreads on the coating layer 311 and then is evaporated by the air to generate latent heat of evaporation, thereby cooling the battery module 300. In the first embodiment, the user can periodically replenish the liquid to the liquid supply unit 500 separately.

In the first embodiment, the reason why coolant is used as the liquid is that evaporation heat of the water used as the coolant is 2.23 kJ/g at standard temperature pressure (STP), which is the highest among liquids. Generally, the heating value (energy amount) of the battery module 300 per day is 1 to 3 kWh (3.6 to 10.8 kJ), and theoretically, the coolant consumption per day is 1.6 to 4.8 g. Accordingly, if the capacity of the liquid supply unit 500 is 1.5 liters, 300 days will be available, and thus, even if the user replenishes the coolant once a year, the battery module 300 can be cooled efficiently and the vehicle is easy to use.

FIGS. 6 to 7 show the second embodiment of the present disclosure, wherein it is shown that the liquid stored in the liquid supply unit 500 is washer fluid. Here, it is preferred that the liquid supply unit 500 be disposed at a location higher than the battery module 300. In particular, in the second embodiment, a washer fluid tank generally provided in a vehicle may be used as the liquid supply unit 500. Accordingly, cooling of the battery module 300 and cleaning of the windshield 150 of the vehicle should be performed selectively or simultaneously using the liquid supply unit 500, so it is preferred that a multiway valve 550 controlled by the control unit 600 be provided between the liquid supply unit 500 and the injection unit 700. The multiway valve 550 is connected with the liquid supply unit 500, the injection unit 700, and a washer nozzle 130, and the control unit 600 controls the multiway valve 550 to be selectively opened and closed, thereby cooling the battery module 300 or cleaning the windshield 150. In the present disclosure, the multiway valve 550 is a three-way valve, but not limited thereto.

Accordingly, as in the first embodiment, in the BMS 610 of the vehicle, if it is determined that the battery module 300 needs to be cooled, the outside temperature and the temperature rising rate of the battery module 300 are sensed to determine the amount of the liquid supplied from the liquid supply unit 500, and a signal is sent to the control unit 600. Then, the control unit 600 controls the pump 530 to be operated, and adjusts the degree of opening of the door 931 of the outlet 930. Further, the degree of opening of the multiway valve 550 is adjusted such that the liquid supply unit 500 and the injection unit 700 are connected to each other, and a port at a side of the washer nozzle 130 is closed. Accordingly, the liquid of the liquid supply unit 500 passes through the flow tube 710 and is injected through the injection nozzles 730, and the air introduced from the front of the vehicle is discharged through the outlet 930 via the inlet 910. Thus, the liquid injected on the upper surface of the battery module 300 spreads on the coating layer 311 and then is evaporated by the air to generate latent heat of evaporation, thereby cooling the battery module 300. The control unit 600 closes the port of the multiway valve 550 at the side of the washer nozzle 130 when cooling of the battery module 300 is not needed.

FIGS. 8 to 9 show the third embodiment of the present disclosure, wherein it is shown that the liquid stored in the liquid supply unit 500 is condensate generated from the core 810 of the air conditioning system 800 of the vehicle, and the liquid supply unit 500 is a water box receiving the condensate generated from the core 810. Here, it is preferred that the liquid supply unit 500 be disposed at a location lower than the core 810 of the air conditioning system 800. Accordingly, the liquid supply unit 500 may be provided with an introduction tube 510 for collecting the condensate generated from the core 810 in the liquid supply unit 500. The introduction tube 510 is configured such that a first end thereof is connected to the core 810 and a second end thereof is connected to the liquid supply unit 500, so as to collect the condensate generated from the core 810 when the air conditioning system 800 is operated, in the liquid supply unit 500.

The amount of the condensate generated from the core 810 is 0.57 to 2.01 g/s based on 200 to 300 CMH, so if a driver drives a vehicle for 4 hours a day, it is predicted that the condensate will be between 0.8 and 2.9 kg. Accordingly, the condensate of the core 810 is enough to cool the battery module 300, and here, the user does not have to fill the liquid supply unit 500 separately, so it is convenient.

As in the first embodiment, in the third embodiment, in the BMS 610 of the vehicle, if it is determined that the battery module 300 needs to be cooled, the outside temperature and the temperature rising rate of the battery module 300 are sensed to determine the amount of the liquid supplied from the liquid supply unit 500, and a signal is sent to the control unit 600. Then, the control unit 600 controls the pump 530 to be operated, and adjusts the degree of opening of the door 931 of the outlet 930. Accordingly, the liquid of the liquid supply unit 500 passes through the flow tube 710 and is injected through the injection nozzles 730, and the air introduced from the front of the vehicle is discharged through the outlet 930 via the inlet 910. Thus, the liquid injected on the upper surface of the battery module 300 spreads on the coating layer 311 and then is evaporated by the air to generate latent heat of evaporation, thereby cooling the battery module 300.

Further, in all the embodiment described above, the vehicle body 100 may be provided with an induction tube 110 configured to collect liquid outside the vehicle and supply the same to the liquid supply unit 500, such that the liquid supply unit 500 is constantly filled with liquid to cool the battery module 300 without the liquid being separately supplied to the liquid supply unit 500.

Accordingly, according to the battery cooling system for a vehicle of the present disclosure configured as described above, unlike the conventional system, in which the air conditioner or the cooling module is operated to cool the battery module so the consumed power is 1 to 4 kW, in the present disclosure, since the battery module can be cooled by only operating the pump, it is possible to sufficiently cool the battery module by only about 10 W consumed by the pump, whereby the mileage of the electric vehicle can be increased.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A battery cooling system for a vehicle, comprising:
 a battery module supplying drive energy to the vehicle;
 a liquid supply unit supplying liquid to the battery module; and
 an injection unit configured such that a first side thereof is connected to the liquid supply unit to be supplied with liquid from the liquid supply unit and a second side thereof is adjacent to the battery module to supply the liquid supplied from the liquid supply unit to an outer surface of the battery module, thereby cooling the battery module by using latent heat of evaporation of the liquid,
 wherein a vehicle body is provided with an induction tube configured to collect liquid outside the vehicle and supply the same to the liquid supply unit, such that the liquid supply unit is constantly filled with liquid to cool the battery module without the liquid being separately supplied to the liquid supply unit.

2. The battery cooling system of claim 1, wherein the battery module is provided with a casing surrounding an outermost portion thereof.

3. The battery cooling system of claim 1, wherein the injection unit includes:
 a flow tube configured such that a first side thereof is connected to the liquid supply unit and a second side thereof extends from the liquid supply unit to be adjacent to the battery module; and
 a plurality of injection nozzles provided to be spaced apart from the flow tube at a predetermined interval,
 wherein the liquid of the liquid supply unit flows along the flow tube and then is injected through the injection nozzles.

4. The battery cooling system of claim 3, wherein the battery module is provided with a seat groove grooved toward the battery module at a location corresponding to the flow tube, such that the flow tube is seated in the seat groove.

5. The battery cooling system of claim 1, wherein the battery module is disposed under a vehicle floor while being spaced apart therefrom, such that a space is provided between the vehicle floor and the battery module with the injection unit disposed in the space, whereby an upper portion of the battery module is cooled.

6. The battery cooling system of claim 5, wherein the space is configured such that a first side thereof is provided with an inlet to allow air to be introduced therethrough from an outside of the vehicle and a second side thereof is provided with an outlet to exhaust the air flowing in the space, and
 the liquid injected by the injection unit during vehicle travel is evaporated by running wind introduced through the inlet, whereby the battery module is cooled by latent heat of evaporation
 wherein the running wind is a pressurized air introduced through the inlet from the outside of the vehicle when the vehicle has traveled or is traveling.

7. The battery cooling system of claim 6, wherein the inlet is disposed at a front of the vehicle and the outlet is disposed at a back of the vehicle,
 wherein the air flows from the inlet to the outlet in the space by the running wind.

8. The battery cooling system of claim 6, wherein the inlet or the outlet is provided with a door opening and closing the inlet or the outlet so as to adjust an amount of the air flowing in the space.

9. The battery cooling system of claim 1, wherein the battery module is disposed to be spaced apart from a vehicle body such that a space is provided between the vehicle body and the battery module, and
 the injection unit includes a flow tube with the liquid of the liquid supply unit flowing therethrough,
 wherein the flow tube extends in a longitudinal direction of the vehicle to avoid resistance to a flow of the air passing through the space.

10. The battery cooling system of claim 1, wherein a pump is provided between the liquid supply unit and the injection unit, and when the pump is operated, the liquid of the liquid supply unit flows through the injection unit to cool the battery module.

11. The battery cooling system of claim 1, wherein the liquid supply unit is a reservoir tank disposed at a location higher than the battery module, and
 the liquid stored in the liquid supply unit is coolant.

12. The battery cooling system of claim 1, wherein the liquid supply unit is disposed at a location higher than the battery module, and
 the liquid stored in the liquid supply unit is washer fluid.

13. The battery cooling system of claim 12, wherein a multiway valve controlled by a control unit is provided between the liquid supply unit and the injection unit, and
 the multiway valve is connected with the liquid supply unit, the injection unit, and a washer nozzle, and the control unit controls the multiway valve to be selectively opened and closed, thereby cooling the battery module or cleaning a windshield.

14. The battery cooling system of claim 1, wherein the liquid supply unit is disposed at a location lower than a core of an air conditioning system of the vehicle.

15. The battery cooling system of claim 14, wherein the liquid supply unit is a water box receiving condensate of the core generated when the air conditioning system is operated, from below, to collect the condensate.

* * * * *